US012706757B2

(12) United States Patent
Yoshimura et al.

(10) Patent No.: US 12,706,757 B2
(45) Date of Patent: Aug. 11, 2026

(54) USER DEVICE FOR ACQUIRING VERIFIABLE CLAIMS, SYSTEM INCLUDING SAID USER DEVICE, AND METHOD FOR ACQUIRING VERIFIABLE CLAIMS

(71) Applicant: NOMURA RESEARCH INSTITUTE, LTD., Tokyo (JP)

(72) Inventors: Satoshi Yoshimura, Tokyo (JP); Hideaki Furukawa, Tokyo (JP); Masashi Kawaguchi, Tokyo (JP)

(73) Assignee: Nomura Research Institute, Ltd., Tokyo (JP)

(*) Notice: Subject to any disclaimer, the term of this patent is extended or adjusted under 35 U.S.C. 154(b) by 121 days.

(21) Appl. No.: 18/576,945

(22) PCT Filed: Jun. 28, 2022

(86) PCT No.: PCT/JP2022/025806
§ 371 (c)(1),
(2) Date: Jan. 5, 2024

(87) PCT Pub. No.: WO2023/282129
PCT Pub. Date: Jan. 12, 2023

(65) Prior Publication Data

US 2024/0291671 A1 Aug. 29, 2024

(30) Foreign Application Priority Data

Jul. 6, 2021 (JP) ................................ 2021-112290

(51) Int. Cl.
*H04L 9/00* (2022.01)
*H04L 9/32* (2006.01)

(52) U.S. Cl.
CPC .......... *H04L 9/3263* (2013.01); *H04L 9/3236* (2013.01)

(58) Field of Classification Search
CPC ....... H04L 9/3263; H04L 9/3236; H04L 9/08; H04L 9/16; H04L 9/32; H04L 9/3218; H04L 9/3239; H04L 9/50
See application file for complete search history.

(56) References Cited

U.S. PATENT DOCUMENTS

2002/0046335 A1* 4/2002 Baum-Waidner ............................ G06Q 20/3829 726/26
2015/0319164 A1 11/2015 Campagna et al.
(Continued)

FOREIGN PATENT DOCUMENTS

CN 113065868 A 7/2021
WO 2020107033 A1 5/2020
WO 2021/033262 A1 2/2021

OTHER PUBLICATIONS

International Search Report (ISR) dated Sep. 27, 2022 filed in PCT/JP2022/025806.
(Continued)

*Primary Examiner* — Kevin Ayala
(74) *Attorney, Agent, or Firm* — RANKIN, HILL & CLARK LLP

(57) ABSTRACT

A user device includes: a holding unit that holds confidential information; a generation unit that generates a generator; an arithmetic unit that calculates a commitment corresponding to the generator, on the basis of the generator and the confidential information; and an acquisition unit that transmits, to a first external device, an acquisition request including the generator and the commitment corresponding to the generator, to acquire a verifiable claim (VC) including the generator and the commitment corresponding to the generator. In the user device, the value of the generator the acquisition unit uses to newly acquire the VC is different
(Continued)

from the value of the generator the acquisition unit has used to acquire the VC in the past.

4 Claims, 6 Drawing Sheets

(56) References Cited

U.S. PATENT DOCUMENTS

| | | | | |
|---|---|---|---|---|
| 2017/0357816 | A1 | 12/2017 | Sharma et al. | |
| 2019/0327091 | A1* | 10/2019 | Acar | H04L 63/083 |
| 2022/0321357 | A1 | 10/2022 | Omori et al. | |
| 2022/0321555 | A1* | 10/2022 | Stolbikov | H04L 9/3218 |
| 2023/0071022 | A1* | 3/2023 | Hong | H04L 9/3265 |

OTHER PUBLICATIONS

Verifiable Credentials Data Model v1.0. W3C, Nov. 19, 2019, total 115 pages [online], Retrieved from the Internet <https://www.w3.org/TR/2019/REC-vc-data-model-20191119/#syntaxes>.

Indian Office Action dated Jun. 1, 2026 and issued for Indian Patent Application No. 202447005617.

* cited by examiner

FIG. 1

CP#1
CP#2
...
CP#N
VC#1
VC#2
...
VC#N
USER DEVICE
VC#1
VC#2
VC#1
VC#N
RP#1
RP#2
...
RP#M

VC#1(DID#1)
VC#1(DID#M)
VC#2(DID#1)
...
VC#N(DID#M)

USER DEVICE

VC#1(DID#1)
VC#2(DID#2)
VC#1(DID#M)
VC#N(DID#M)

RP#1
RP#2
...
RP#M

USER DEVICE
NETWORK
RP#1
RP#2
RP#M
CP#1
CP#2
CP#N
1
2
3
4

USER DEVICE FOR ACQUIRING VERIFIABLE CLAIMS, SYSTEM INCLUDING SAID USER DEVICE, AND METHOD FOR ACQUIRING VERIFIABLE CLAIMS

TECHNICAL FIELD

The present disclosure relates to verifiable claims.

BACKGROUND ART

Non Patent Literature 1 discloses "verifiable credentials". Note that verifiable credentials may also be referred to as verifiable claims (VCs). In the description below, verifiable claim and verifiable credentials are referred to simply as "claims". A claim contains personal information about its owner. Examples of the personal information included in a claim may be the date of birth, educational background, medical history, assets, and the like of the owner of the claim. Claims are issued by organizations (hereinafter referred to as CPs (Claims Providers)) that can guarantee personal information included in the claims, such as local governments, schools, hospitals, and banks, for example. An owner submits a claim containing personal information to an organization (hereinafter referred to as a relying party (RP)) that needs to check the personal information, so that the RP can confirm that the owner satisfies a predetermined condition. Specifically, the RP can confirm that the owner is at a predetermined age and over, or has assets of a predetermined amount of money or more, for example.

Note that a claim includes a signature generated with a private key of the CP that issues the claim, for example. By verifying the signature included in the claim presented with the public key of the CP that has issued the claim, the RP can confirm that the presented claim has been issued by the CP, and the content of the presented claim has not been altered. Further, a distributed identifier (DID) may be included in a claim in order for the RP to determine whether the party that has submitted the claim to the RP is the legitimate owner of the claim. The DID is a unique identifier of the owner, and its value can be obtained by the owner becoming an identity provider. When issuing a claim, the CP incorporates the value of the DID into the claim. Thus, the claim is associated with the DID.

Since the personal information that can be guaranteed by a CP depends on the content thereof, there may be a plurality of CPs for the respective types (age, educational background, assets, and the like) of personal information. Furthermore, there are various organizations that need to check personal information, and therefore, there may be a plurality of RPs.

CITATION LIST

Non Patent Literature

Non Patent Literature 1: "Verifiable Credentials Data Model 1.0", [online], Nov. 19, 2019, W3C, searched in the Internet on Jun. 18, 2021<URL:https://www.w3.org/TR/vc-data-model/>

SUMMARY OF INVENTION

Technical Problem

Figure 1:
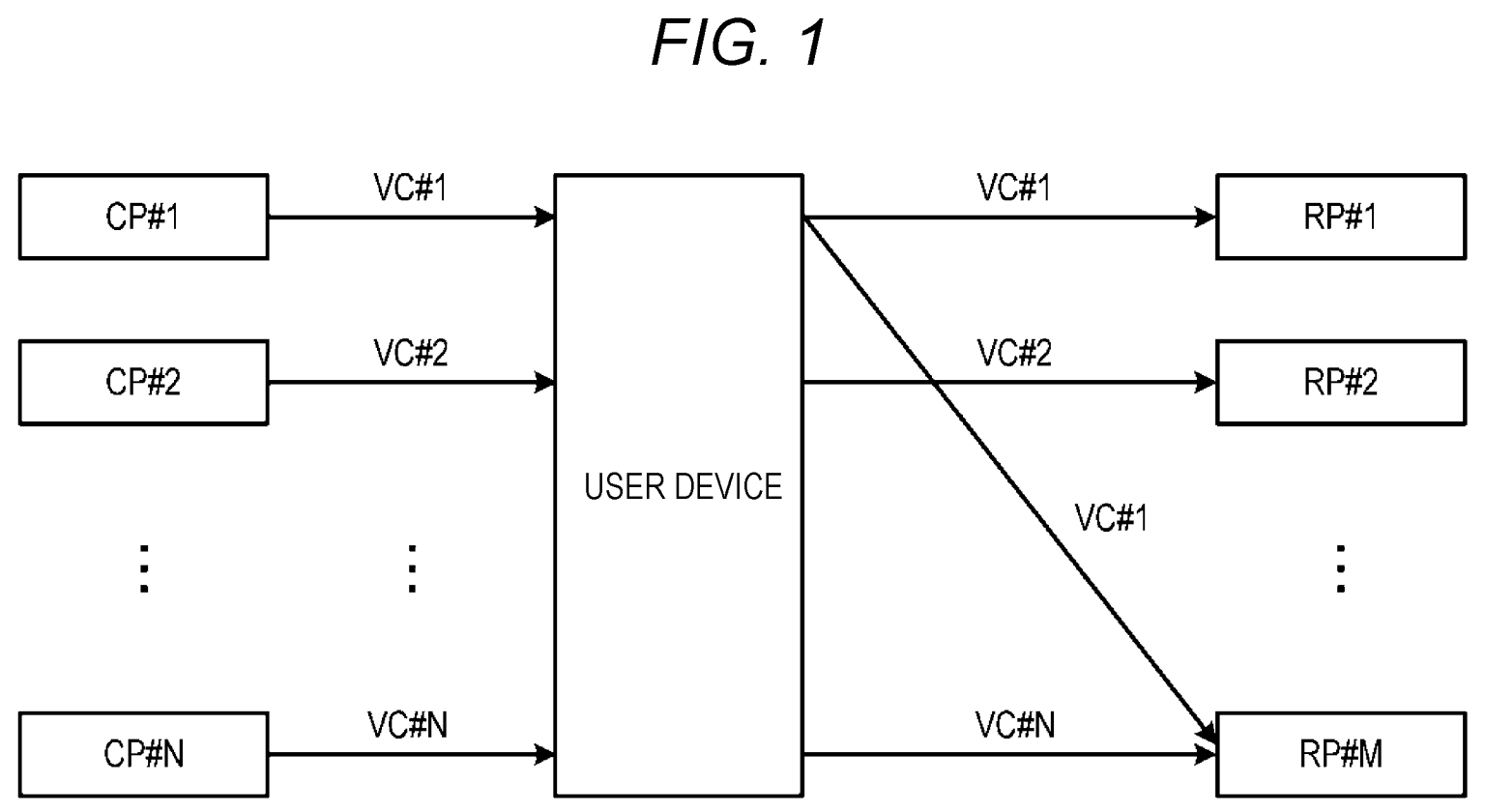

FIG. 1 shows N (N being an integer of 1 or greater herein) CPs #1 to #N, and M (M being an integer of 1 or greater herein) RPs #1 to #M. The user device in FIG. 1 is a device that is used by a claim owner (hereinafter referred to as the user) who acquires claims from the CPs and presents the claims to the RPs. The user device may be a smartphone, a tablet, or a personal computer (PC), for example. The user device receives and stores a claim VC #n from a CP #n (n being an integer of 1 to N). Note that claims VC #1 to VC #N are associated with the same DID. In this case, the user device needs to use the same DID among the RPs #1 to #M.

However, when the same DID is used for all the RPs, a so-called "name-based aggregation" problem occurs. For example, in FIG. 1, the RP #2 receives the VC #2, and the RP #M receives the VC #1 and the VC #N. If the DID used by the user is the same for all the RPs, the RP #2 and the RP #M cooperate (collude), so that the RP #2 and the RP #M can determine that the users who have submitted the VC #1, the VC #2, and the VC #N are the same. As various claims from a user for whom RPs cooperate with each other are identified in this manner, the RPs can unrightfully acquire various kinds of personal information about the user.

Therefore, it is conceivable to use a different DID for each RP as illustrated in FIG. 2. In the description below, the user uses the DID of a value DID #m for the RP #m (m being an integer of 1 to M). Further, the claim associated with the DID #m acquired from the CP #n is represented by the VC #n (DID #m). The user device acquires two VCs #1 (DID #1) and #1 (DID #M) from the CP #1. The user device presents the VC #1 (DID #1) to the RP #1, and the VC #1 (DID #M) to the RP #M. As the value of the DID is made to vary with each RP in this manner, it becomes difficult to identify claims from the same user even if the RPs cooperate with each other, and the disadvantage of "name-based aggregation" can be avoided.

However, in a case where the user submits the VC #2 to the RP #1 in the state illustrated in FIG. 2, for example, the user device needs to first request the CP #2 to generate the VC #2 (DID #1), to acquire the VC #2 (DID #1). It is also possible to acquire all combinations (which are N×M) of claims in advance, but it is not preferable to acquire, retain, and manage a large number of claims of which it is unclear whether or not to be used (to be presented to the RPs) in the future. As described above, in the configuration in FIG. 2, each claim can be presented only to a specific RP. With user-friendliness being taken into consideration, it is preferable that an acquired claim can be submitted to a desired RP.

For this reason, a configuration in which a public key of the user is included in each claim can be considered. In this case, a RP transmits a challenge to the user device when a claim is presented. The user device generates a signature for the challenge with a private key paired with the public key included in the claim, and sends the signature to the RP. The RP can verify the signature with the public key included in the claim, to determine whether the user is an authorized owner of the claim. With this configuration, each claim to be acquired is not associated with a specific RP.

In this case, however, the user needs to make the public keys included in the claims different from each other. That is, the user device needs to manage the private keys paired with the public keys included in the respective claims, and the amount of information to be kept secret by the user device becomes larger.

Solution to Problem

The present invention provides a technology for making it difficult to perform name-based aggregation, eliminating restrictions on claim submission destinations, and reducing the amount of information held in a user device.

According to one aspect of the present disclosure, a user device includes: a holding unit that holds confidential information; a generation unit that generates a generator; an arithmetic unit that calculates a commitment corresponding to the generator, on the basis of the generator and the confidential information; and an acquisition unit that transmits, to a first external device, an acquisition request including the generator and the commitment corresponding to the generator, to acquire a verifiable claim (VC) including the generator and the commitment corresponding to the generator. In the user device, the value of the generator the acquisition unit uses to newly acquire the VC is different from the value of the generator the acquisition unit has used to acquire the VC in the past.

Advantageous Effects of Invention

According to the present invention, name-based aggregation can be made difficult to perform, restrictions on claim submission destinations can be eliminated, and the amount of information held in a user device can be reduced.

Other features and advantages of the invention will become apparent from the following description with reference to the accompanying drawings. Moreover, in the accompanying drawings, the same or similar components are denoted by the same reference numerals.

BRIEF DESCRIPTION OF DRAWINGS

FIG. 1 is an explanatory diagram illustrating a case where the same DID is used for each RP.

Figure 2:
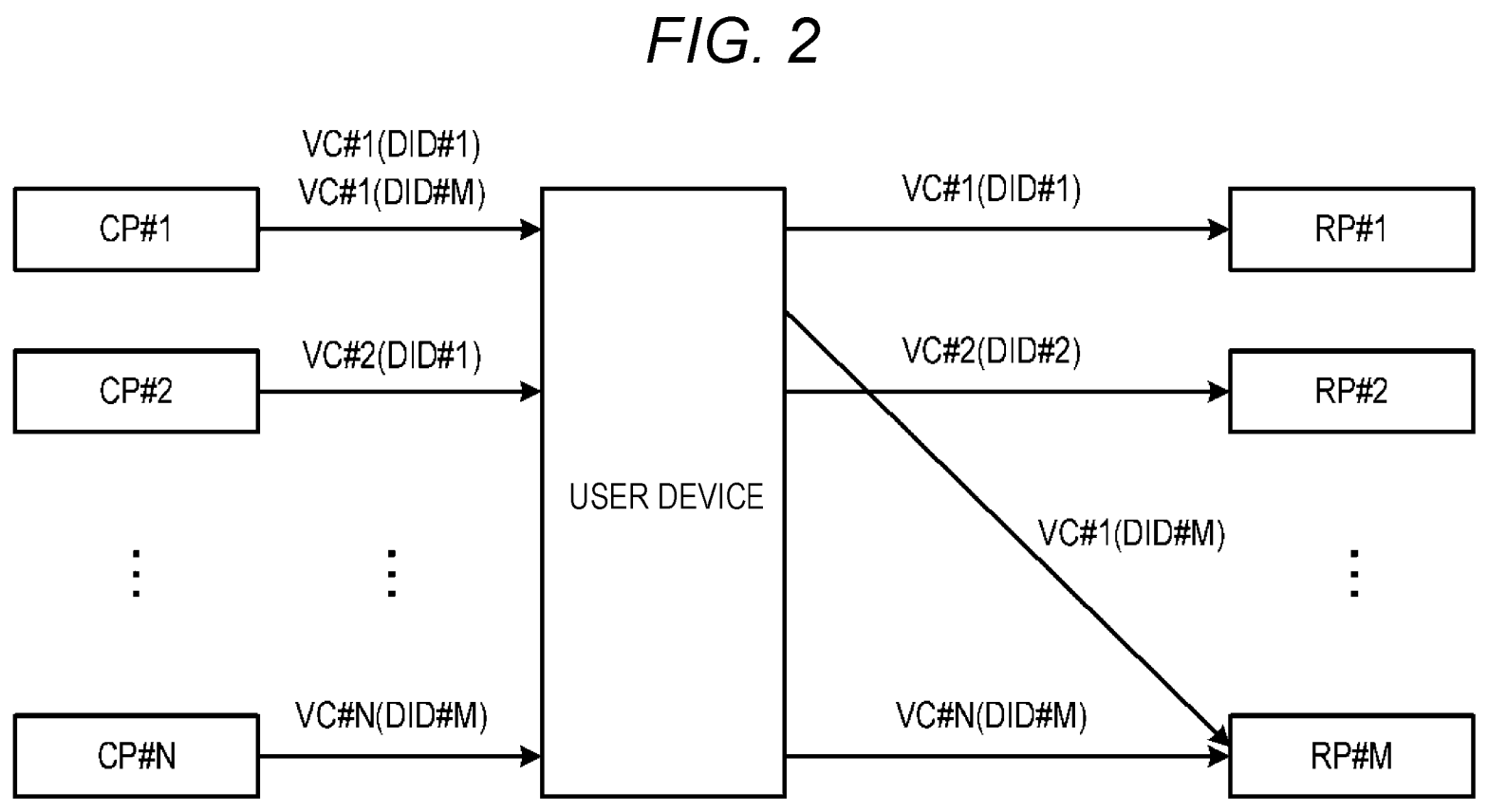

FIG. 2 is an explanatory diagram illustrating a case where a different DID is used for each RP.

DESCRIPTION OF EMBODIMENTS

Figure 3:
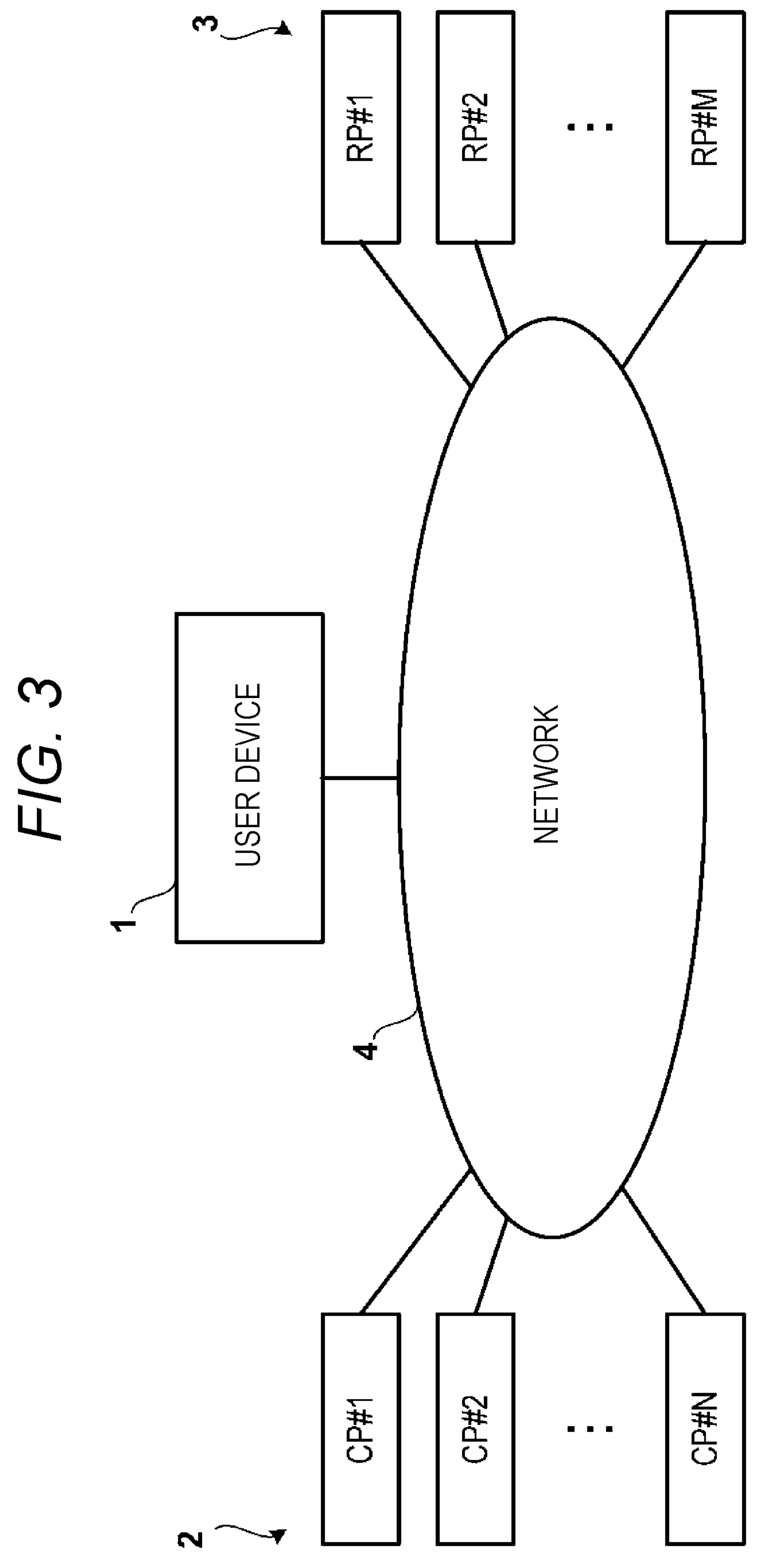
FIG. 3 is a configuration diagram of a system according to an embodiment.

The following is a detailed description of embodiments, with reference to the accompanying drawings. Note that the embodiments described below do not limit the inventions according to the claims, and all the combinations of features described in the embodiments are not necessarily essential to the invention. Two or more features of a plurality of features described in the embodiments may be combined as appropriate. Further, the same or similar components are denoted by the same reference numerals, and explanation of them will not be repeated.

First Embodiment

FIG. 3 is a configuration diagram of a system according to the present embodiment. A user device 1, a plurality of CPs 2, and a plurality of RPs 3 are connected to a network 4. The user device 1 is designed to be capable of communicating with the plurality of CPs 2 and the plurality of RPs 3 via the network 4. In FIG. 1, the number of the CPs 2 is N (N being an integer of 1 or greater), and the number of the RPs 3 is M (M being an integer of 1 or greater). Note that, in the description below, the individual CPs 2 are represented by CP #n (n being an integer of 1 to N) when distinguished from one another, and the individual RPs 3 are represented by RP #m (m being an integer of 1 to M) when distinguished from one another. The user device 1 acquires and stores a claim from the CP 2, in accordance with the user's operation. The user device 1 also presents the stored claim to the RP 3, in accordance with the user's operation. In FIG. 3, the number of combinations of the CPs 2 and the RPs 3 is N×M, and, in the description below, the user device 1 acquires N×M claims beforehand, for example. Note that the user device acquires M claims from each CP 3.

Figure 4:
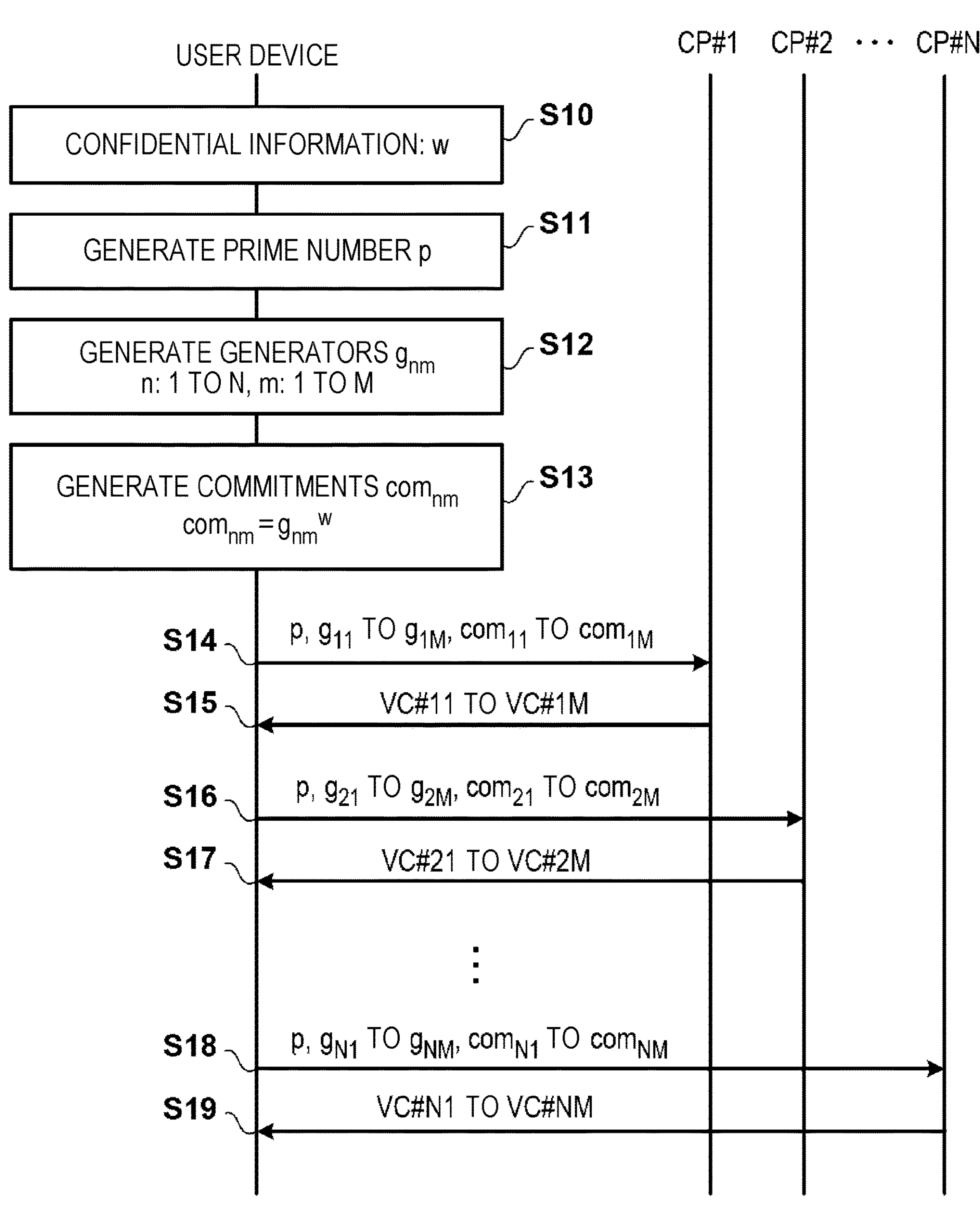
FIG. 4 is a sequence chart of a claim acquisition process according to an embodiment.

FIG. 4 is a sequence diagram of a claim acquisition process. The user device 1 holds confidential information w (S10). In S11, the user device 1 generates a prime number p. Note that all the arithmetic operations in the description below are remainder operations for prime number p. However, for ease of explanation, the fact that these operations are remainder operations, or the notation "mod p" (congruent expression) will be omitted. Further, the present disclosure concerns implementations that rely on the discrete logarithm problem. However, it will be understood by those skilled in the art that implementations that rely on different difficulties, such as the discrete logarithm problem on elliptic curves, are possible without replacing the roles of the device. In S12, the user device 1 generates N×M generators $g_{nm}$ as many as the number of claims to be acquired. Note that the values of all the generators $g_{nm}$ are different. The generators $g_{nm}$ can be randomly generated without regularity, for example. The user device 1 may also record the generators used in the past, and select generators without any overlap. In S13, the user device generates commitments $com_{nm}=g_{nm}^{w}$, on the basis of the values of the generators $g_{nm}$ and the value corresponding to the confidential information w.

In S14, the user device 1 transmits, to the CP #1, a claim generation request including the prime number p, the generators $g_{11}$ to $g_{1M}$, and the commitments $com_{11}$ to $com_{1M}$. In response to the claim generation request, the CP #1 generates a total of M claims VC #11 to VC #1M. A claim VC #1M includes the prime number p, a generator $g_{1m}$, and a commitment $com_{1m}$, in addition to the personal information about the user guaranteed by the CP #1. The claim VC #1*m* may also include a signature generated with the private key of the CP #1. In S15, the CP #1 transmits the generated claims VC #11 to VC #1M to the user device 1. The user device 1 stores the received claims VC #11 to VC #1M.

In S16, the user device 1 transmits a claim generation request to the CP #2. This claim generation request includes the prime number p, generators $g_{21}$ to $g_{2M}$, and commitments $com_{21}$ to $com_{2M}$. In response to the claim generation request, the CP #2 generates a total of M claims VC #21 to VC #2M. A claim VC #2*m* includes the prime number p, a generator $g_{2m}$, and a commitment $com_{2m}$, in addition to the personal information about the user guaranteed by the CP #2. The claim VC #2*m* may also include a signature generated with the private key of the CP #2. In S17, the CP #2 transmits the generated claims VC #21 to VC #2M to the user device 1. The user device 1 stores the received claims VC #21 to VC #2M. Thereafter, the user device 1 repeats transmitting a claim generation request to each CP, and acquiring M claims. Thus, the user device 1 has acquired N×M claims at the end of S19.

Note that the process up to S13 in FIG. 4 can be performed not at the time of acquisition of claims, but at any timing before acquisition of claims. In this case, the generated values are stored in the user device 1.

Next, the process to be performed when the user device 1 presents claims VC #nm acquired from the CP #n to the RP #m will be described with reference to FIG. 5. The user device 1 generates a value r in S20. For example, the user device 1 can randomly generate a value r. It is desirable to select a value r that has not been used for the RP #m in the past. Therefore, the user device 1 may record the values r used in the past, and select a value r that does not overlap a used value r. Hereinafter, the value r will be also referred to as the random value r. Subsequently, in S21, the user device 1 obtains a proof on the basis of the random value r. The proof includes a value x and a value c. The value x is calculated according to $x=g_{nm}{}^{r}$, and the value c is calculated according to c=r−w*Hash (x). Note that Hash (·) is a hash function with which a random oracle is assumed. In S22, the user device 1 notifies the RP #m of the proof, which is the value x and the value c, together with a claim VC #nm. As described above, the VC #nm includes $com_{nm}$, $g_{nm}$, and p.

In S23, the RP #m calculates $Z=g_{nm}{}^{c}*com_{nm}{}^{Hash(x)}$. Note that the hash function to be used in S23 is the same as the hash function to be used in S21. For example, one of the user device 1 and the RP #m determines the hash function to be used in S21 and S23, and notifies the other one of the hash function by any appropriate method. The RP #m compares Z with x in S24. Here, c=r−w*Hash (x), and $$com_{nm} = g_{nm}^{w}. \text{ Therefore,}$$

$$\begin{aligned} Z &= g_{nm}^{c} * com_{nm}^{Hash(x)} \\ &= g_{nm}^{r-w*Hash(x)} * g_{nm}^{w*Hash(x)} \\ &= g_{nm}^{r} \\ &= x \end{aligned}$$

That is, the fact that Z=x means that the confidential information w used to generate $com_{nm}$ is the same as the confidential information w used to calculate the value c. Therefore, it can be determined that the one that has submitted the proof including the value c for Z=x, and the one that has acquired the claim by presenting $com_{nm}$ to the CP #n are the same. Accordingly, if Z=x, the RP #m determines that the claim VC #nm is presented by an authorized owner in S25. If Z≠x, on the other hand, the user device 1 determines in S25 that the claim VC #nm is presented by an unauthorized owner. Note that the process up to S21 in FIG. 5 can be performed not at the time of claim presentation, but at any timing before claim presentation. In this case, the generated values are stored in the user device 1.

Note that, in the above description, to facilitate understanding, at a time of presentation of a claim acquired from the CP #n to the RP #m, the user device 1 presents the VC #nm among the M claims acquired from the CP #n. However, this does not mean that each of a total of M claims VC #n1 to VC #nM acquired from the CP #n by the user device 1 correspond to the RPs #1 to #M on a one-to-one basis, and, if a RP 3 is determined to be the presentation destination, the claims to be presented to the RP 3 accordingly are limited to a specific one among the M claims.

For example, the user device 1 acquires a total of M claims VC #11 to VC #1M from the CP #1. In a case where the user device 1 presents the claims acquired from the CP #1 to the RP #1, the user device 1 may select any one of VCs #11 to #1M. That is, the user device 1 can present the VC #12 or the VC #1M, instead of the VC #11, to the CP #1. This is because a claim according to the present embodiment is not associated with a DID, but is associated with the commitment com included in the claim. A check is made to determine whether the owner is an authorized owner, on the basis of a Schnorr protocol to which Fiat-Shamir Heuristic is applied, which is a non-interactive zero-knowledge proof (NIZK) formed with the commitment com and the proof (x and c). That is, in the present embodiment, the presentation destination of a plurality of claims acquired from a certain CP 2 is not fixed.

In other words, as mentioned in the description of the background, in a case where a different DID is used for each RP 3, and a claim is associated with a DID, the destination of the claims to be issued is fixed. For example, a claim associated with a DID shared with the RP #1 can be presented only to the RP #1. That is, when a different DID is used for each RP 3, and a claim is associated with a DID, there is a relationship indicating that a claim acquisition process is a process for a claim presentation process for a specific RP 3. In the present embodiment, on the other hand, the claim acquisition process and the claim presentation process are independent of each other, and the acquired claims are not associated with a specific RP 3. For example, a claim acquired to be presented to the RP #1 may be presented to a RP 3 other than the RP #1.

Accordingly, claims are generated as in the present embodiment, so that claims that can be presented only to a specific RP 3 are acquired and stored beforehand, and, as a result, waste such as not unused claims can be prevented. Further, the claim acquisition process and the claim presentation process can be made independent of each other. Meanwhile, the information to be presented to a RP 3 for authentication is a value generated on the basis of generators g of different values and a random value r. Therefore, it is difficult to perform name-based aggregation even when the RPs 3 cooperate with each other. Further, the information that the user device 1 should hold as confidential is only the confidential information w, and accordingly, the information amount thereof is small.

Also, in the above description, the user device 1 has acquired N×M claims beforehand. However, this is merely an example, and the number of claims the user device 1 acquires beforehand from each CP 2 is any appropriate number. For example, the user device 1 can determine the number of claims to be acquired beforehand from each CP 2 in accordance with the number (or an expected number) of submission destinations of personal information guaranteed by each CP 2. As a specific non-limiting example, the user device 1 may acquire beforehand a total of five claims: three claims from the CP #1 and two claims from the CP #2. After that, if necessary, the user device 1 can perform advance acquisition of a desired number of claims from each CP 2. However, even in a case where the pre-acquisition process is performed a plurality of times, the values of the generators g included in each of all claims to be acquired are made to vary. Note that the values of the commitments com included in a claim correspond to the values of the generators g included in the same claim.

Figure 5:
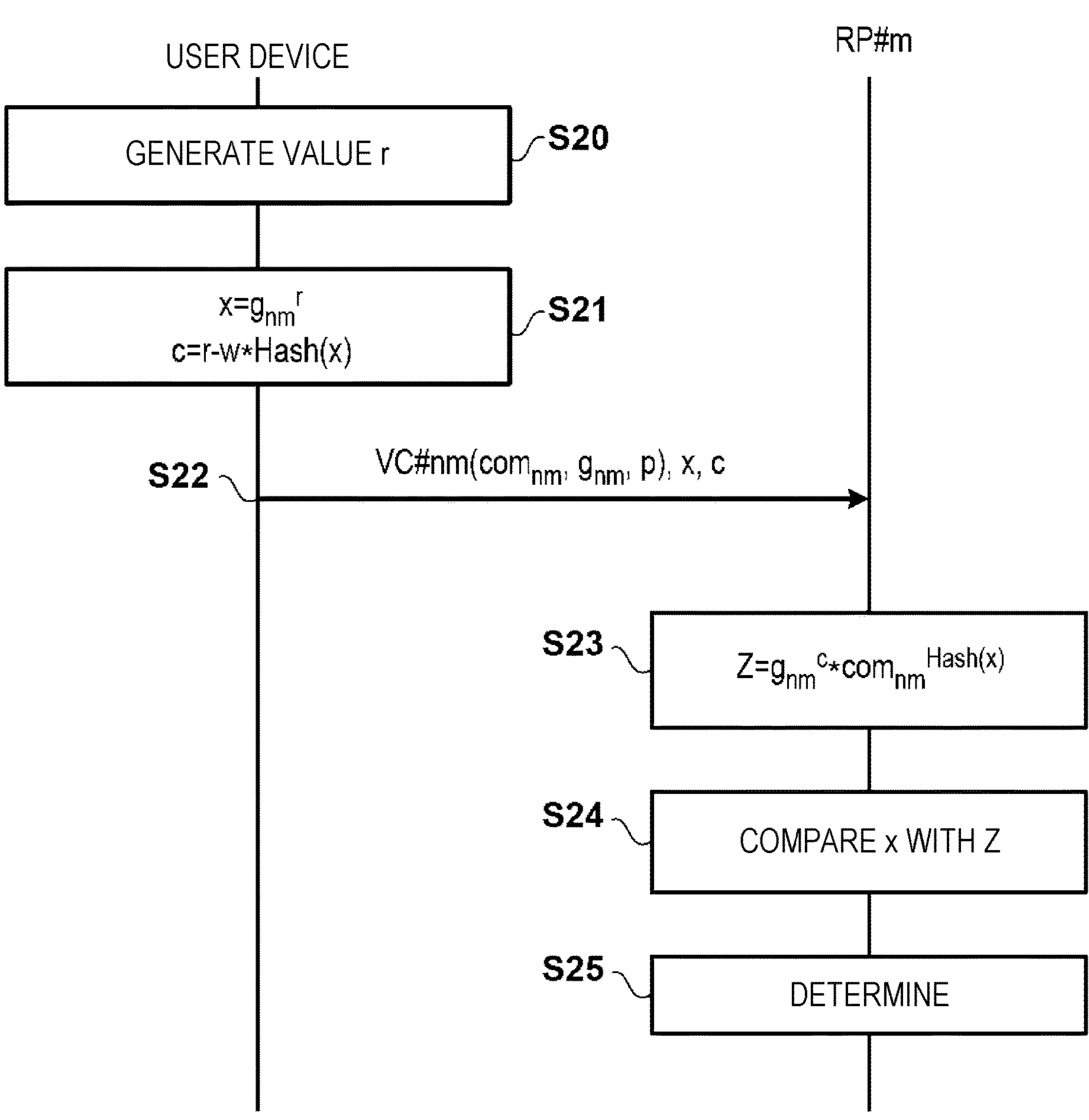
FIG. 5 is a sequence chart of a claim presentation process according to an embodiment.

Note that, in a case where a certain claim has been presented to a certain RP 3 in the past, the user device 1 controls the random value r generated in S20 in FIG. 5 so as to be different from the values used in the past. This is because, if the random value r is the same, the proof value is also the same, and impersonation becomes possible. Therefore, if the random value r generated in S20 is the same as the one used when the same claim was presented to the same RP 3 in the past, the user device 1 repeats generation of the random value r until a value different from the value used in the past is generated. Further, each RP 3 is designed to reject authentication in a case where the same claim as one presented in the past is presented, and the presented proof value is the same as one presented in the past.

Each RP 3 may also be designed to notify the user device 1 of a doubt, instead of rejecting authentication, in a case where the same claim as one presented in the past is presented together with the same proof. In this case, the user device 1 does not need to manage the random values r used in the past, but selects a different random value r, and performs proof calculation of (S21 in FIG. 5) and proof notification (S22 in FIG. 5) again when notified of a doubt from a RP 3. Such a doubt may arise in a case where a RP 3 has received and proven the same value x for the same VC #nm in the past.

Further, the procedures of a zero-knowledge interactive proof in which a RP 3 notifies the user device 1 of the value chal of a challenge may be implemented, instead of the process of S22 to S25, or in addition to the process of S22 to S25. In this case, the user device 1 notifies the RP 3 that c'=r−w*chal. The RP 3 then performs authentication by comparing x with $Z=g_{nm}^{c'}*com_{nm}^{chal}$.

Second Embodiment

Next, a second embodiment is described, with a focus on differences from the first embodiment. In the first embodiment, the user device 1 generates commitments $com_{nm}$ as $com_{nm}=g_{nm}^{w}$. That is, the values corresponding to the same confidential information w are used for generating all the commitments. In the present embodiment, to generate the commitments $com_{nm}$, the user device 1 first calculates derived confidential information w #nm on the basis of the confidential information w, according to w #nm=Hash (w; $g_{nm}$). Note that this hash function can be different from the hash function used in the process illustrated in FIG. 5. The user device 1 then calculates commitments $com_{nm}$ according to $com_{nm}=g_{nm}^{w\ \#nm}$. Therefore, in the calculation of the value c in FIG. 5, the user device 1 also uses the derived confidential information w #nm, instead of the confidential information w. Since the values of the generators $g_{nm}$ are all different, the values of the derived confidential information w #nm are also different. Accordingly, the values of the confidential information w can be disordered, and name-based aggregation can be made more difficult.

<Configuration of the User Device>

Figure 6:
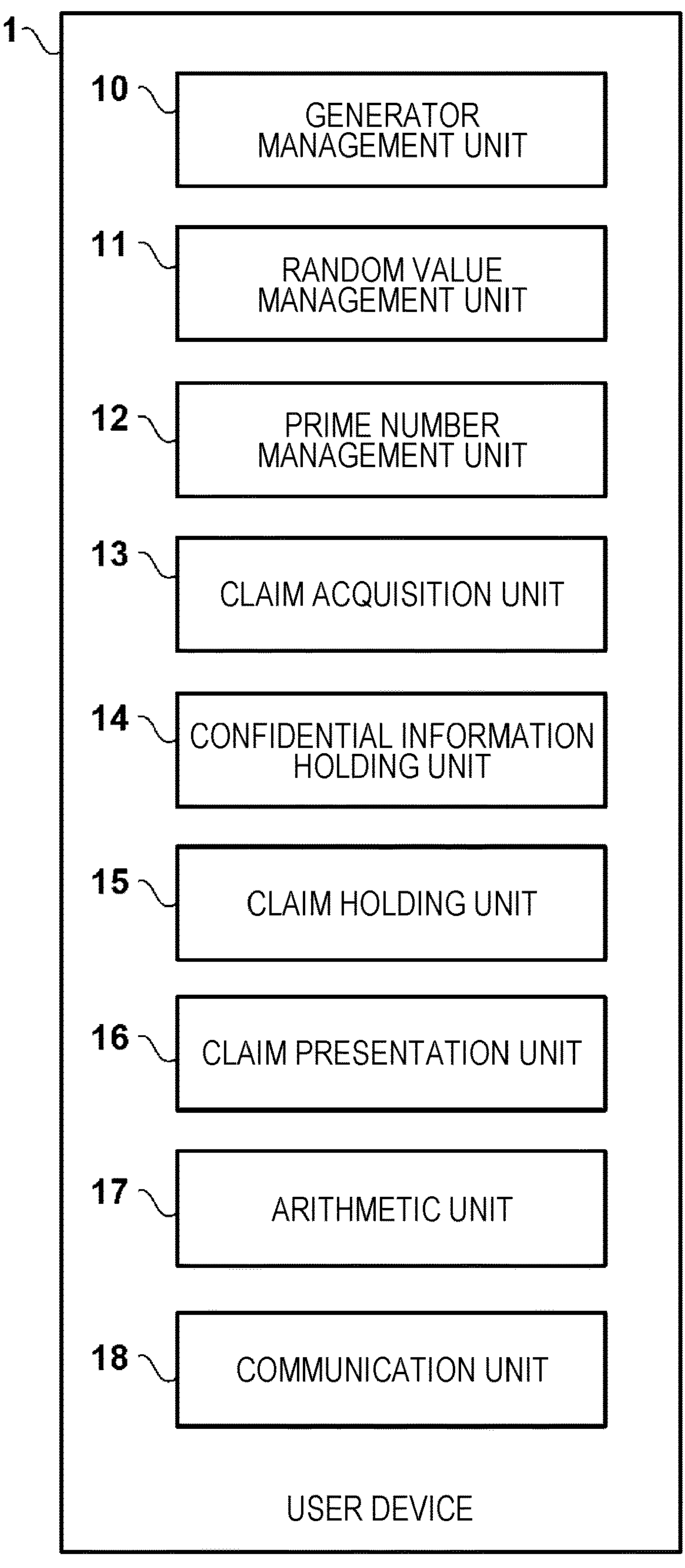
FIG. 6 is a functional block diagram of a user device according to an embodiment.

FIG. 6 illustrates a functional block diagram of the user device 1 of each of the above embodiments. It is possible to obtain the functional blocks illustrated in FIG. 6, by causing one or more processors to execute an appropriate program, the one or more processors and one or more memory devices being included in an apparatus (device) such as a smartphone, a tablet, or a PC.

A generator management unit 10 generates generators g. Note that the generator management unit 10 holds the values of the generators g generated and used for claims in the past, and, in a case where generators g are newly generated, the generator management unit 10 performs management so as not to generate a generator g having the same value as any of the generators g used in the past. The generator management unit 10 also randomly generates the generators g so that any regularity does not occur in the generation of the generators g, for example. The generator management unit 10 generates a random value, and determines whether the value is the same as any of the values used for claims in the past, for example. In a case where the generated value is not the same as any of the values used for claims in the past, the generator management unit 10 sets the generated value as a new generator g. In a case where the generated value is the same as one of the values used for claims in the past, on the other hand, the generator management unit 10 selects a value different from any of the values used for claims in the past.

A random value management unit 11 generates the random value r to be used when presenting a claim to a RP 3 (S20 in FIG. 5). In one example, the random value management unit 11 manages and holds the value of the random value r used when a claim is presented to a RP 3. When the claim is presented to the RP 3, the random value management unit 11 manages generation of the random value r so as not to use the random value r used when the claim was presented to the RP 3 in the past. Note that, as described above, the random value management unit 11 can also be designed to regenerate the random value r in a case where a doubt for the proof is reported from the RP 3. A prime number management unit 12 generates and holds a prime number p.

A claim acquisition unit 13 requests each CP 2 to acquire claims, and performs a process of acquiring the claims. As described above, when acquiring claims, the claim acquisition unit 12 notifies the CP 2 of the prime number p, generators g, and commitments com.

A confidential information holding unit 14 holds the confidential information w, and a claim holding unit 15 stores the claims acquired from the CPs 2 in a memory device. Note that the claims are not necessarily stored in a memory device inside the user device 1, but may be stored in a memory device in a device outside the user device 1. The external device may be a peripheral device connectable to the user device 1. Alternatively, the external device may be a device capable of communicating with the user device 1 via the network 4. That is, the claim holding unit 15 stores claims in a storage device inside or outside the user device 1.

A claim presentation unit 16 presents a claim to a RP 3. As described above, the claim presentation unit 15 presents a proof (x and c) to the RP 3, together with the claim.

An arithmetic unit 17 calculates the commitments com, and the value x and the value c. Further, in the case of the second embodiment, the arithmetic unit 17 also generates derived confidential information on the basis of the confidential information w and the generators g. A communication unit 18 performs communication processes with the CPs 2 and the RPs 3 via the network 4.

Note that the user device 1 according to the present invention can be realized by a program that causes a device having one or more processors to operate as the user device 1 when executed by the one or more processors of the device. These computer programs can be stored in a non-transitory computer-readable storage medium or be distributed via a network.

Also, in the examples described in the above embodiments, the user device 1 is a device independent of the CPs 2 and the RPs 3 (for example, the functions of the user device 1 are implemented as applications installed in a smartphone or a personal computer). However, some of the functions of the user device 1 may be included in the CPs 2 or the RPs 3. For example, in a case where a CP 2 is implemented as a system including a web application server, all the functions of the user device 1 may be implemented on the side of the CP 2, processes by the functions of the user device 1 implemented on the side of the CP 2 and processes by the functions originally implemented in the CP 2 may be performed independently in an inaccessible state, and the CP 2 may store information about the user device 1 and the generated information as user-specific information. Note that, in a case where some of the functions remain on the user side, the functions can be implemented as plug-in of a web browser.

The invention is not limited to the above embodiments, and various modifications and changes can be made within the scope of the invention.

The present application claims priority based on JP 2021-112290 A, filed on Jul. 6, 2021, the entire contents of which are incorporated herein by reference.

The invention claimed is:

1. A user device comprising:

one or more processors; and one or more memory devices configured to store one or more programs, wherein the one or more programs, when executed by the one or more processors, cause the user device to function as:

a holding unit that holds confidential information;

a generation unit that generates a generator;

an arithmetic unit that calculates a commitment corresponding to the generator, on a basis of the generator and the confidential information;

an acquisition unit that transmits, to a first external device, an acquisition request including the generator and the commitment corresponding to the generator, to acquire a verifiable claim (VC) including the generator and the commitment corresponding to the generator; and a presentation unit that presents a proof of the VC including a first value and a second value to a second external device, together with the VC that the acquisition unit has acquired, wherein a value of the generator that the acquisition unit uses to newly acquire the VC is different from a value of the generator that the acquisition unit has used to acquire the VC in a past, the arithmetic unit calculates the first value on a basis of the generator included in the VC presented by the presentation unit and a third value, and calculates the second value on a basis of a hash value of the first value, the third value, and a value corresponding to the confidential information, and when the presentation unit presents a first VC to the second external device, and the presentation unit has presented the first VC to the second external device in a past, the arithmetic unit makes the third value to be used to calculate the first value and the second value different from the third value used when the first VC was presented to the second external device in the past.

2. The user device according to claim 1, wherein the arithmetic unit calculates an output value of a hash function having the value of the generator and a value corresponding to the confidential information as inputs, and calculates the commitment corresponding to the generator on a basis of the output value and the value of the generator.

3. A system comprising: a user device; one or more first external devices; and one or more second external devices, wherein the user device includes one or more processors and one or more memory devices configured to store one or more programs, the one or more programs, when executed by the one or more processors, causing the user device to function as:

a holding unit that holds confidential information;

a generation unit that generates a generator;

an arithmetic unit that calculates a commitment corresponding to the generator, on a basis of the generator and the confidential information; and a first transmission unit that transmits, to at least one first external device of the one or more first external devices, an acquisition request including one or more generators and one or more commitments corresponding to each of the one or more generators to acquire one or more verifiable claims (VCs) corresponding to each of the one or more generators, and a presentation unit that presents a proof of a VC including a first value and a second value to one second external device of the one or more second external devices, together with the VC acquired as a response to the acquisition request transmitted to the at least one first external device, the one or more first external devices are configured to transmit, to the user device, the one or more VCs, each VC including the generator and the commitment corresponding to the generator, and the one or more second external devices are configured to determine whether a user of the user device is an owner of the VC on a basis of the generator and the commitment included in the VC and the proof, when the proof of the VC is presented together with the VC from the user device, wherein values of the one or more generators included in the acquisition request to be transmitted by the first transmission unit to the at least one first external device are different from each other, and are different from values of the one or more generators included in the acquisition request that the first transmission unit has transmitted in a past, and the first value is a value based on the generator included in the VC to be presented to the one second external device and a third value, and the second value is a value based on a hash value of the first value, the third value, and a value corresponding to the confidential information.

4. A method in a user device, the method comprising:

transmitting an acquisition request including one or more generators and one or more commitments corresponding to each of the one or more generators to a first external device, the one or more commitments having been generated on a basis of each of the one or more generators and confidential information held by the user device;

receiving, as a response to the transmitting the acquisition request, one or more verifiable claims (VCs) corresponding to each of the one or more generators from the first external device, each VC including the generator and the commitment corresponding to the generator;

transmitting, to a second external device, one VC of the one or more VCs and a proof corresponding to the one VC, wherein values of the one or more generators included in the acquisition request are different from each other, and are different from values of the one or more generators included in the acquisition request that the user device has transmitted in a past, and the proof corresponding to the one VC includes: a first value based on the generator included in the one VC and a random value; and a second value based on a hash value of the first value, the random value, and a value corresponding to the confidential information.

* * * * *